US012759505B2

(12) United States Patent
Reisinger et al.

(10) Patent No.: US 12,759,505 B2
(45) Date of Patent: Oct. 13, 2026

(54) METHODS AND DEVICES FOR DETERMINING A DISTANCE VALUE REPRESENTING A TRANSIT TIME AND/OR A SPACING BETWEEN AT LEAST TWO TRANSCEIVERS, IN PARTICULAR BY A MOTOR VEHICLE AND BY A VEHICLE KEY

(71) Applicant: Continental Automotive GmbH, Hannover (DE)

(72) Inventors: Thomas Reisinger, Regenstauf (DE); Thomas Eichstetter, Regensburg (DE)

(73) Assignee: AUMOVIO Germany GmbH, Frankfurt am Main (DE)

( * ) Notice: Subject to any disclaimer, the term of this patent is extended or adjusted under 35 U.S.C. 154(b) by 1091 days.

(21) Appl. No.: 17/630,397

(22) PCT Filed: Jul. 22, 2020

(86) PCT No.: PCT/EP2020/070693
§ 371 (c)(1),
(2) Date: Jan. 26, 2022

(87) PCT Pub. No.: WO2021/018692
PCT Pub. Date: Feb. 4, 2021

(65) Prior Publication Data

US 2022/0289142 A1 Sep. 15, 2022

(30) Foreign Application Priority Data

Jul. 26, 2019 (DE) ..................... 10 2019 211 152.1

(51) Int. Cl.
*B60R 25/24* (2013.01)
*G07C 9/00* (2020.01)
*H01Q 1/32* (2006.01)

(52) U.S. Cl.
CPC ........ *B60R 25/245* (2013.01); *G07C 9/00309* (2013.01); *H01Q 1/3241* (2013.01);
(Continued)

(58) Field of Classification Search
None
See application file for complete search history.

(56) References Cited

U.S. PATENT DOCUMENTS

2007/0085658 A1 4/2007 King et al.
2010/0305779 A1 12/2010 Hassan et al.
(Continued)

FOREIGN PATENT DOCUMENTS

CN 102138080 A 7/2011
CN 102785634 A 11/2012
(Continued)

OTHER PUBLICATIONS

"APS013 Application Note—The implementation of two-way ranging with the DW1000", Version 2.3, Decawave, 2015.
(Continued)

*Primary Examiner* — Carlos Garcia

(57) ABSTRACT

Disclosed are a method and a device for determining, repeated in time intervals, of at least one of a distance value representing a time of flight and a distance between at least two transceivers by exchanging messages between the at least two transceivers, wherein on the part of at least one transceiver: at least one antenna is provided in each case for transferring messages by in each case at least one of transmitting and receiving the messages, wherein furthermore at least one evaluation unit is provided to determine a first distance value using messages transferred by at least one antenna and to determine at least one second distance value using of messages transferred by at least one antenna, wherein furthermore a selection unit is provided, which is
(Continued)

configured to select in each case, from the last determined distance values, the smallest distance value.

19 Claims, 18 Drawing Sheets

(52) U.S. Cl.
CPC .............. *G07C 2009/00261* (2013.01); *G07C 2009/00341* (2013.01); *G07C 2209/63* (2013.01)

(56) References Cited

U.S. PATENT DOCUMENTS

| | | | |
|---|---|---|---|
| 2012/0316703 A1 | 12/2012 | Hermann et al. | |
| 2016/0001742 A1 | 1/2016 | Miyazawa et al. | |
| 2017/0063477 A1 | 3/2017 | Ressinger et al. | |
| 2017/0318423 A1 | 11/2017 | Reisinger et al. | |
| 2018/0188349 A1 | 7/2018 | Lee et al. | |
| 2018/0254910 A1 | 9/2018 | Dutz et al. | |
| 2018/0275267 A1 | 9/2018 | Reisinger et al. | |
| 2022/0289142 A1* | 9/2022 | Reisinger | G01S 13/765 |

FOREIGN PATENT DOCUMENTS

| | | | |
|---|---|---|---|
| CN | 105243704 | A | 1/2016 |
| CN | 106296881 | A | 1/2017 |
| CN | 108216121 | A | 6/2018 |
| CN | 108248545 | A | 7/2018 |
| CN | 108540159 | A | 9/2018 |
| CN | 108540160 | A | 9/2018 |
| CN | 108693502 | A | 10/2018 |
| CN | 109477889 | A | 3/2019 |
| DE | 102015216331 | B4 | 3/2017 |
| EP | 2962910 | A1 | 1/2016 |
| EP | 3370365 | A1 | 9/2018 |
| EP | 3396640 | A1 | 10/2018 |
| JP | 2019085734 | A | 6/2019 |
| KR | 20100026519 | A | 3/2010 |

OTHER PUBLICATIONS

Mohommadreza Yavari et al. "Ultra Wideband Wireless Positioning Systems", TTechnical Report TR14-230, University of New Brunswick; http://www.decawave.com/sites/default/files/resources/uwb_wireless_positioning_systems_technical_report.pdf, Mar. 27, 2014, Canada.

Leitjen "Design of antenna-diversity transceivers for wireless consumer products", Eindhoven University of Technology, Jan. 1, 2001.

Office Action dated Jan. 18, 2024 from corresponding Chinese patent application No. 202080053929.4.

Chen Minzhe Et El. "Design of Indoor Parking Areas High-precision Localization System Based on UWB", Microcontrollers & Embedded Systems, 2018, Issue 4, China Academic Journal Electronic Publishing House.

Office Action dated Jul. 7, 2024 from corresponding Chinese patent application No. 202080053929.4.

International Search Report and Written Opinion dated Oct. 28, 2020 from corresponding International Patent application No. PCT/EP2020/070693.

Fourth Office Action issued on Jan. 21, 2025 from corresponding Chinese patent application No. 202080053929.4.

Decision of Rejection dated Apr. 16, 2025 from corresponding Chinese patent application No. 202080053929.4.

Search Findings of Search Report dated Jan. 15, 2024 from corresponding Chinese patent application No. 202080053929.4.

* cited by examiner $$Tof = \frac{Trnd1 \times Trnd2 - Trsp1 \times Trsp2}{Trnd1 \times Trnd2 + Trsp1 \times Trsp2}$$

METHODS AND DEVICES FOR DETERMINING A DISTANCE VALUE REPRESENTING A TRANSIT TIME AND/OR A SPACING BETWEEN AT LEAST TWO TRANSCEIVERS, IN PARTICULAR BY A MOTOR VEHICLE AND BY A VEHICLE KEY

Methods and devices for determining a distance value representing a time of flight and/or a distance between at least two transceivers, in particular on the part of a motor vehicle and a vehicle key

Technical Field

The application relates to methods and devices for determining a distance value representing a time of flight and/or a distance between at least two transceivers, in particular on the part of a motor vehicle and a vehicle key provided for opening and/or starting a motor vehicle, by exchanging messages between the at least two transceivers.

Summary

One object of the invention is to optimize a determination of a time of flight and/or a distance between at least two transceivers (transmitting and receiving units). The object is achieved by the subjects of each of the independent claims. Several particularly advantageous embodiments of the invention are specified in the dependent claims and the description. Embodiments of the invention can, as alternatives to existing solutions, enable a distance determination and/or time of flight determination which is not susceptible to manipulation and/or is reliable and/or is efficient.

With respect to some embodiments of the invention according to the dependent claims:

- Embodiments of the invention can, for example, select the preceding (in particular the smaller of the last two) determined distance value if both distance values could not be determined most recently, which can reduce the susceptibility of the measurements to interference and can increase the reliability.
- Embodiments of the invention can, for example, select the single presently (valid) determined distance value if one of the two distance values could not be determined most recently, which can also reduce the susceptibility of the measurements to interference and can increase the reliability.

Embodiments of the invention can be designed, for example, so that

- at least one of the transceivers (for example in a vehicle key/key fob) exchanges messages with more than two further transceivers (for example on the part of a vehicle), in particular to determine multiple distance values and/or distances to each one of the further transceivers, in order to increase the security from manipulation.

Further features and advantages of several advantageous embodiments of the invention result from the following description of several exemplary embodiments of the invention with reference to the drawing.

BRIEF DESCRIPTION OF THE DRAWINGS

In the simplified schematic figures of the drawing, to illustrate several possible embodiments of the invention.

DETAILED DESCRIPTION

Figure 15:
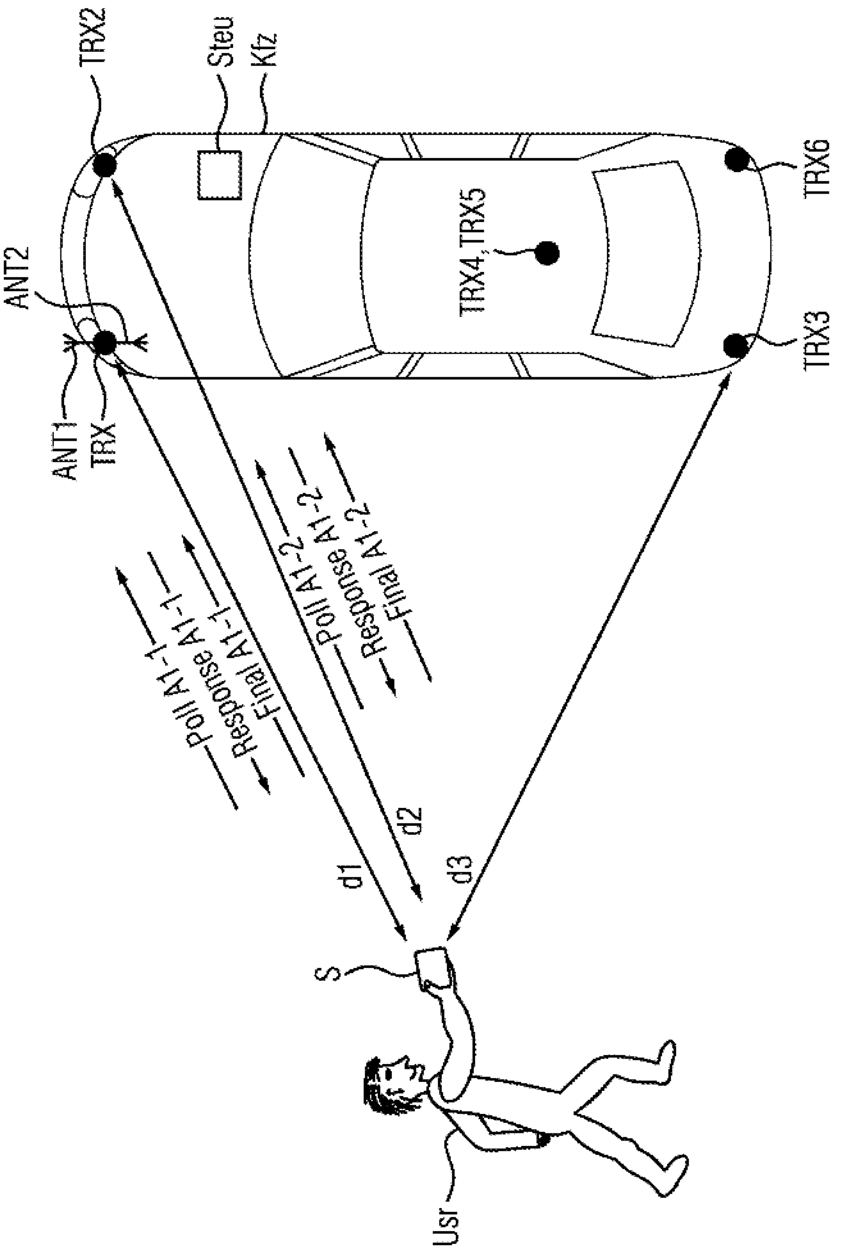
FIG. 15 shows an overview of an embodiment according to the invention of a determination of one or more distances of a transceiver from one or more transceivers on the part of a motor vehicle.

FIG. 15 shows, as an exemplary embodiment of the invention, a user Usr having a first transceiver S (for example in or on a vehicle (radio) key (with or without mechanical key)) for opening and/or starting a motor vehicle Kfz, and/or in/on a mobile radio terminal, using which he exchanges, between a key-side transceiver S and at least one motor vehicle-side further transceiver TRX (or multiple motor vehicle-side (Kfz) transceivers TRX, TRX2 . . . TRX6)

messages (Poll-A1-1, RESP-A1-1, FINAL-A1-1; Poll-A1-2, RESP-A1-2, FINAL-A1-2, etc.) via (for example UWB-based) radio, on the basis of the arrival times/transmission times of which (ToA1, ToA2, ToA3, ToA4, ToA5, ToA6) and/or signal times of flight (T_rnd1, T_rsp1, T_rsp2, Trnd2), at least one distance value R(n*TR) or (abbreviated) R is determined (n is a natural number here), which (R) represents a distance d1 and/or a (calculated using a ranging method, for example mean) time of flight ToF between the key-side transceiver S and at least one motor vehicle-side further transceiver TRX.

On the basis of one or more such distance values R and/or the change thereof over time (n*TR), a controller Steu in the motor vehicle Kfz can decide, for example, to open or not open or close at least one door of the motor vehicle Kfz or permit a start of the engine, for example, not to open a door if it is assumed due to the at least one presently selected distance value d1 and/or a continuous or extensive reduction of the last selected distance values that the key-side transceiver S in particular moves toward a motor vehicle Kfz (or is located therein and/or to preclude that there is a case of fraud).

The distance value R(n*TR) can be determined multiple times, for example, at time intervals TR for example, n times (n=natural number).

Figure 14:
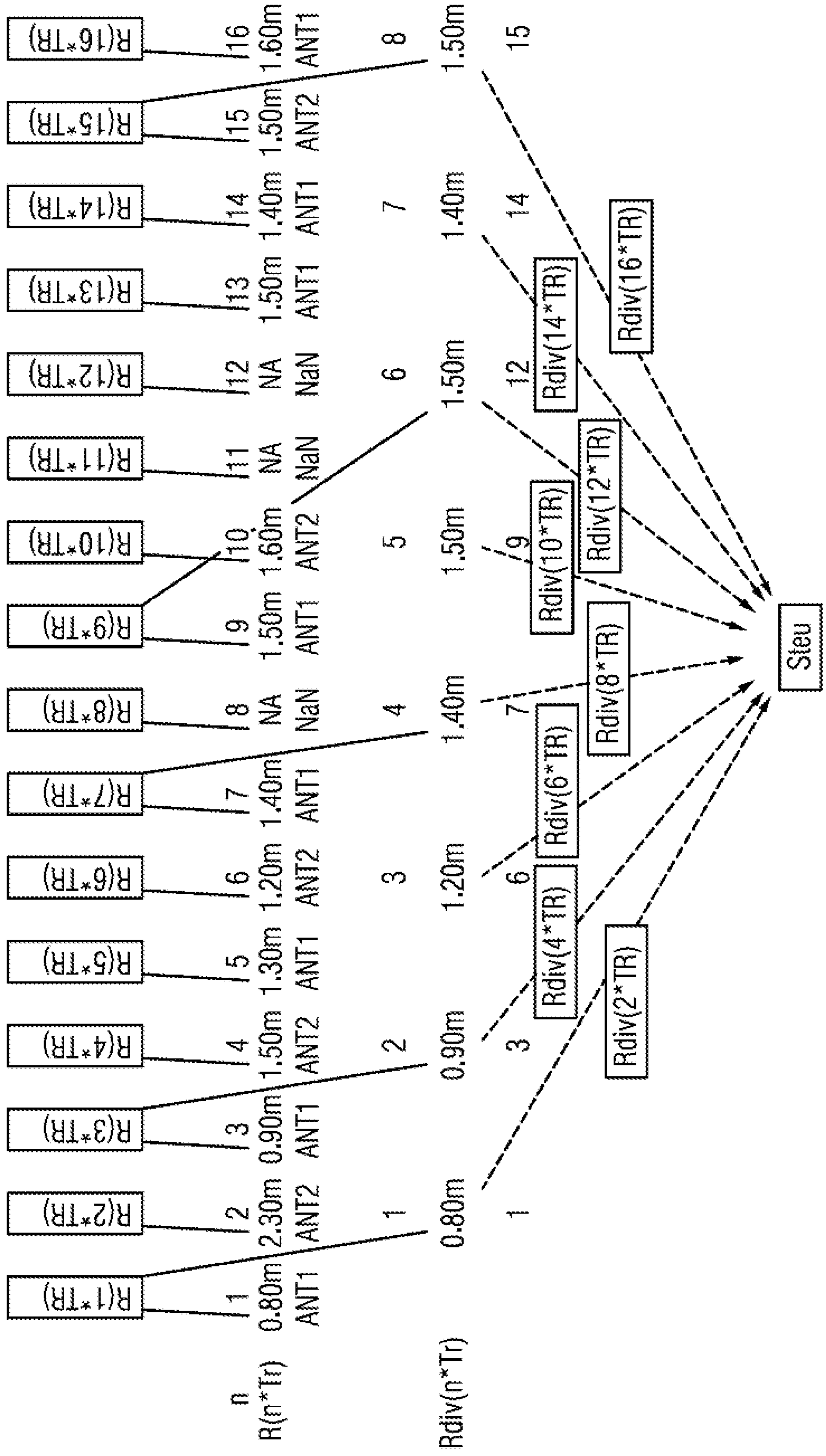
FIG. 14 shows an embodiment according to the invention of a sequence of the respective selection of a present least distance value or the last valid distance value.
Figure 16:
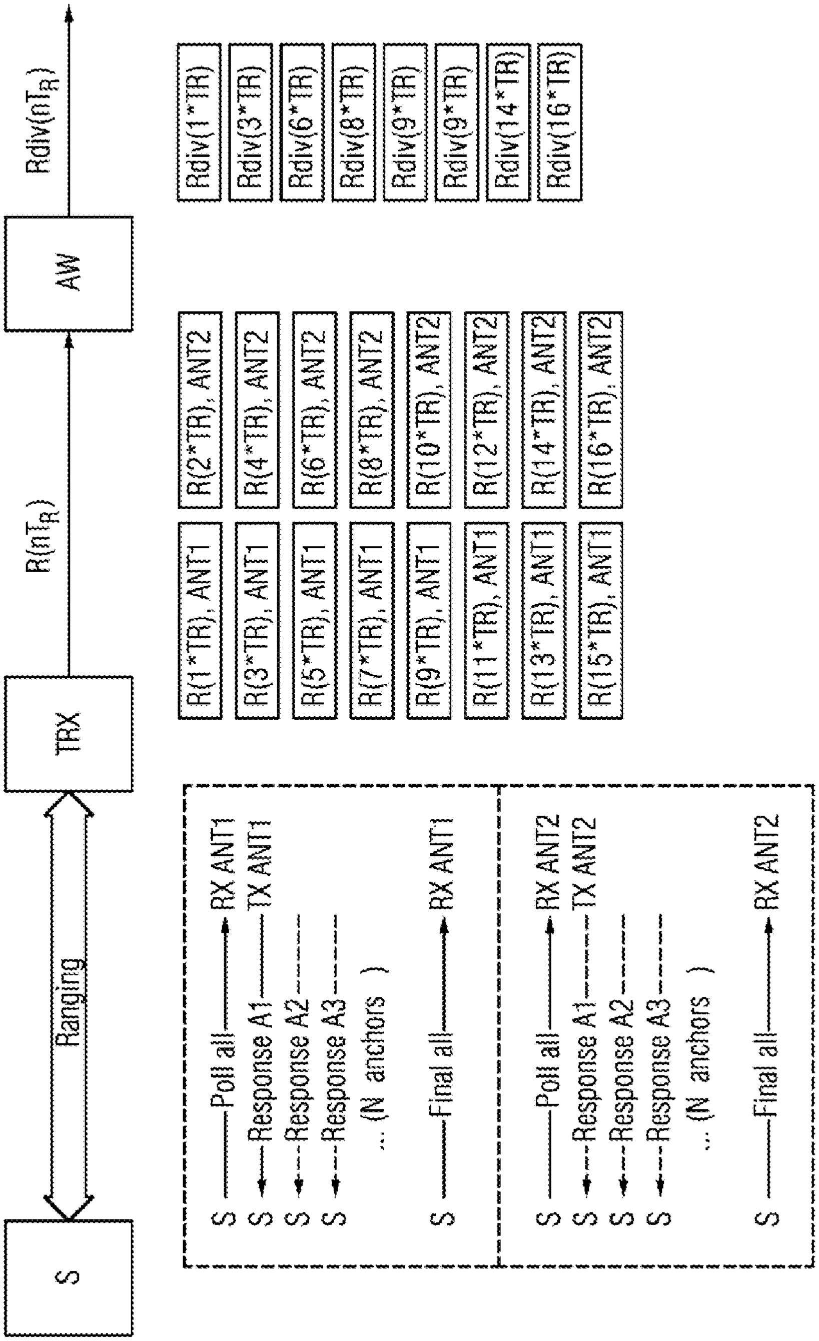
FIG. 16 shows general exemplary ranging methods for the determination repeating at time intervals of distance values R each representing one time of flight or one distance and a subsequent selection of distance values Rdiv from the last distance values R determined to be valid, FIG. 17 schematically shows for one embodiment of the invention an example of a ranging sequence by transferring messages for a determination of distance values, an evaluation unit, for example, in a transceiver for determining distance values R and a selection of the present smallest Rdiv of the stored last determined distance values R using a selection unit, FIG. 18 schematically shows two embodiments of the invention, specifically at the top a sequential determination of two distance values in an evaluation after two sequential ranging sequences, and at the bottom a simultaneous/parallel determination of two distance values into evaluation units after two simultaneous interleaved (simultaneously ending) ranging sequences, FIG. 19 schematically shows, for two embodiments of the invention, in each case a selection of the present smallest Rdiv of the last determined distance values R (for example according to FIG. 17 or 18) using a selection unit min.

As FIG. 16 generally shows, distance values R(n*TR) can be determined multiple times repeatedly, for example, at time intervals TR (TR corresponds to the reciprocal of a frequency f), for example, n times (n=natural number, for example, in FIG. 14 shown up to n=16).

In FIG. 16, using ranging methods repeatedly at time intervals TR, a determination of distance values R (also denoted hereinafter as R(n*TR) with n=natural number) each representing a time of flight or a distance is carried out by exchanging messages (Poll- . . . , Response- . . . , Final- . . . ) between a transceiver S (for example in a vehicle key or fob) and one or more, for example, vehicle-side transceivers TRX, TRX2, etc., using a time of flight/distance calculation (from messages-times of flight/transmission/reception times) And in a selection unit AW (in the transceiver or a control unit Steu of the vehicle, etc.) at time intervals n*TR or 2*n*TR, a subsequent selection is carried out of distance values Rdiv thus selected (also denoted hereinafter as Rdiv(n*TR) with n=natural number) from the last distance values R determined to be valid.

Thus, for example, from the last distance values R(1*TR)=0.80 m and R(2*TR)=2.30 m (by AW) each determined using one of the antennas ANT1, ANT2, the selection of the selected distance value Rdiv (2*TR)=0.80 m takes place at the time 2*TR, which is selected in FIG. 16 by the selection unit in the controller Steu or, if selected in the transceiver, is provided to the controller Steu.

In the general example in FIG. 16, the key S is the initiator of the ranging (message sequence for distance value determination) and at least one transceiver TRX is a transponder thereto, however, this can also be reversed.

Figure 1:
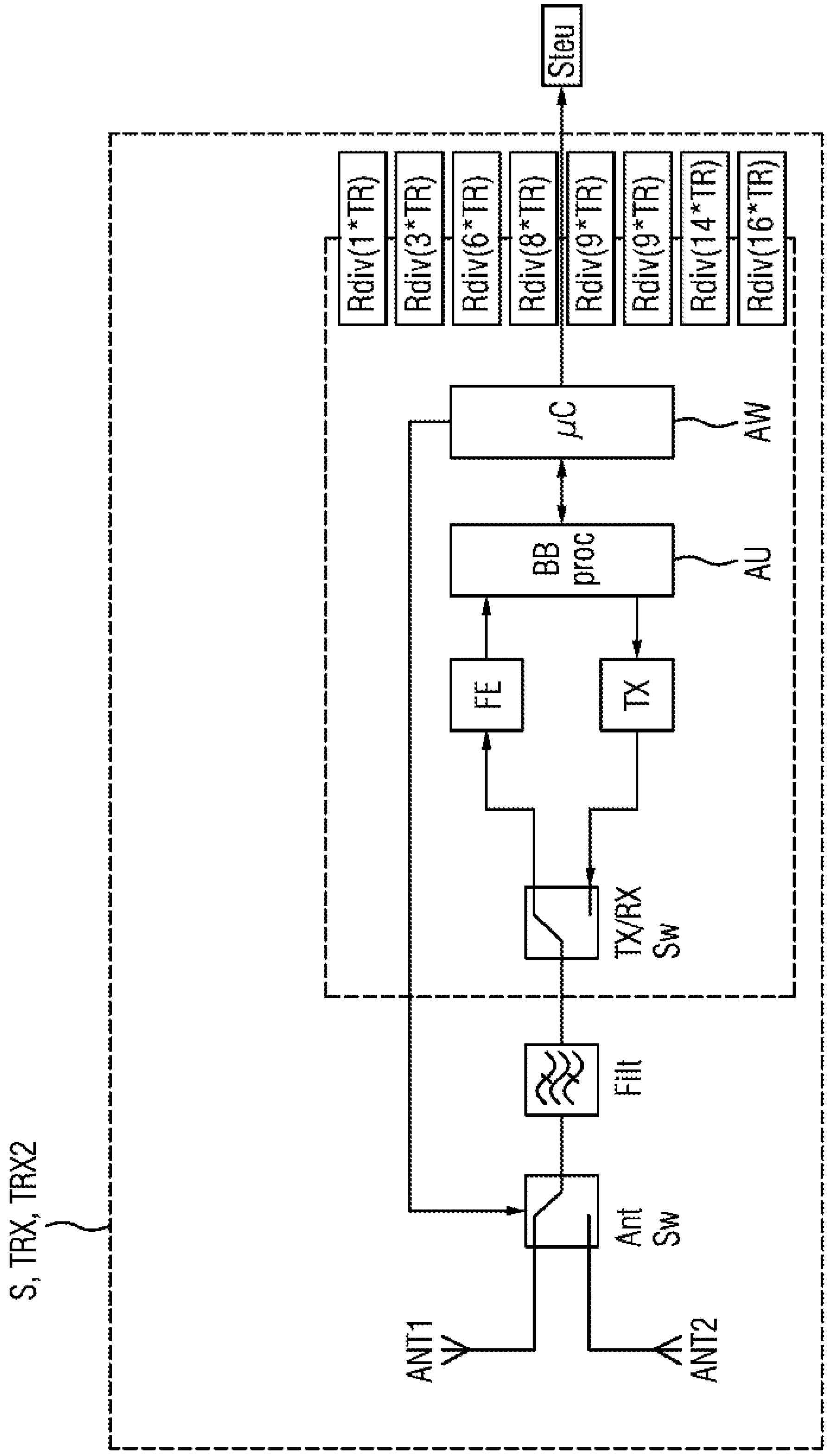
FIG. 1 shows an embodiment according to the invention having only one receiver and having an evaluation unit for the UWB-based determination of a distance value and having a selection unit for determining the smaller of the (switched diversity) distance values.
Figure 12:
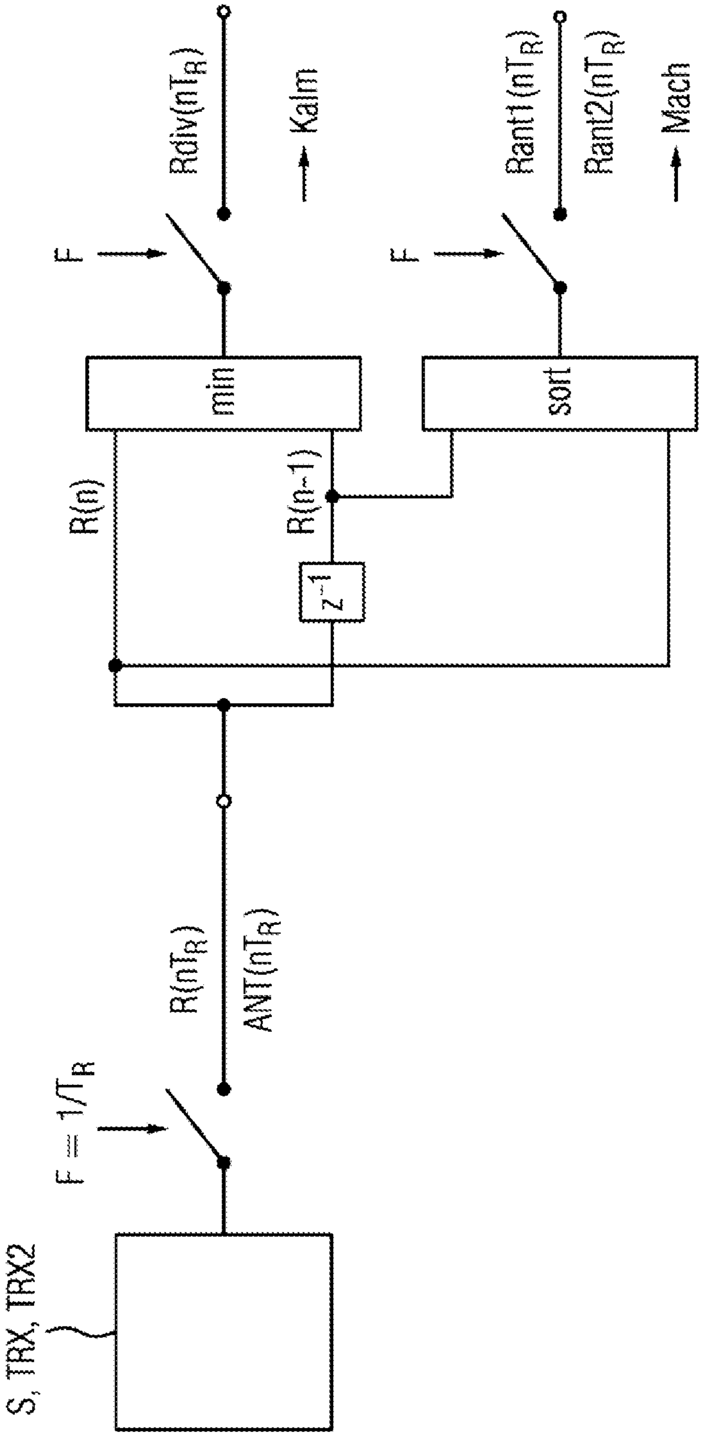
FIG. 12 shows an embodiment according to the invention having a temporary memory for storing at least one (lesser) of the last distance values for the case that, of the present distance values, one or both could not be determined (as valid)

The frequency f=1/TR, at which a selection is carried out by a selection unit AW (in the transceiver or a control unit Steu of the vehicle, etc.)

at time intervals n*TR or 2*n*TR of selected distance values Rdiv(n*TR) from the last distance values R(n*TR) can be, for example (if the ranging values of two antennas are determined by a common evaluation unit) half the (ranging frequency), using which one determined distance value R(n*TR) is determined in each case (for example, significantly faster than TR), as shown in FIGS. 1, 14), or, for example, (if the ranging values of two antennas are each determined by one evaluation unit), can be the same (ranging) frequency using which one determined distance value R(n*TR) is determined in each case (for example, significantly faster than TR), as shown in FIG. 12.

Figure 17:
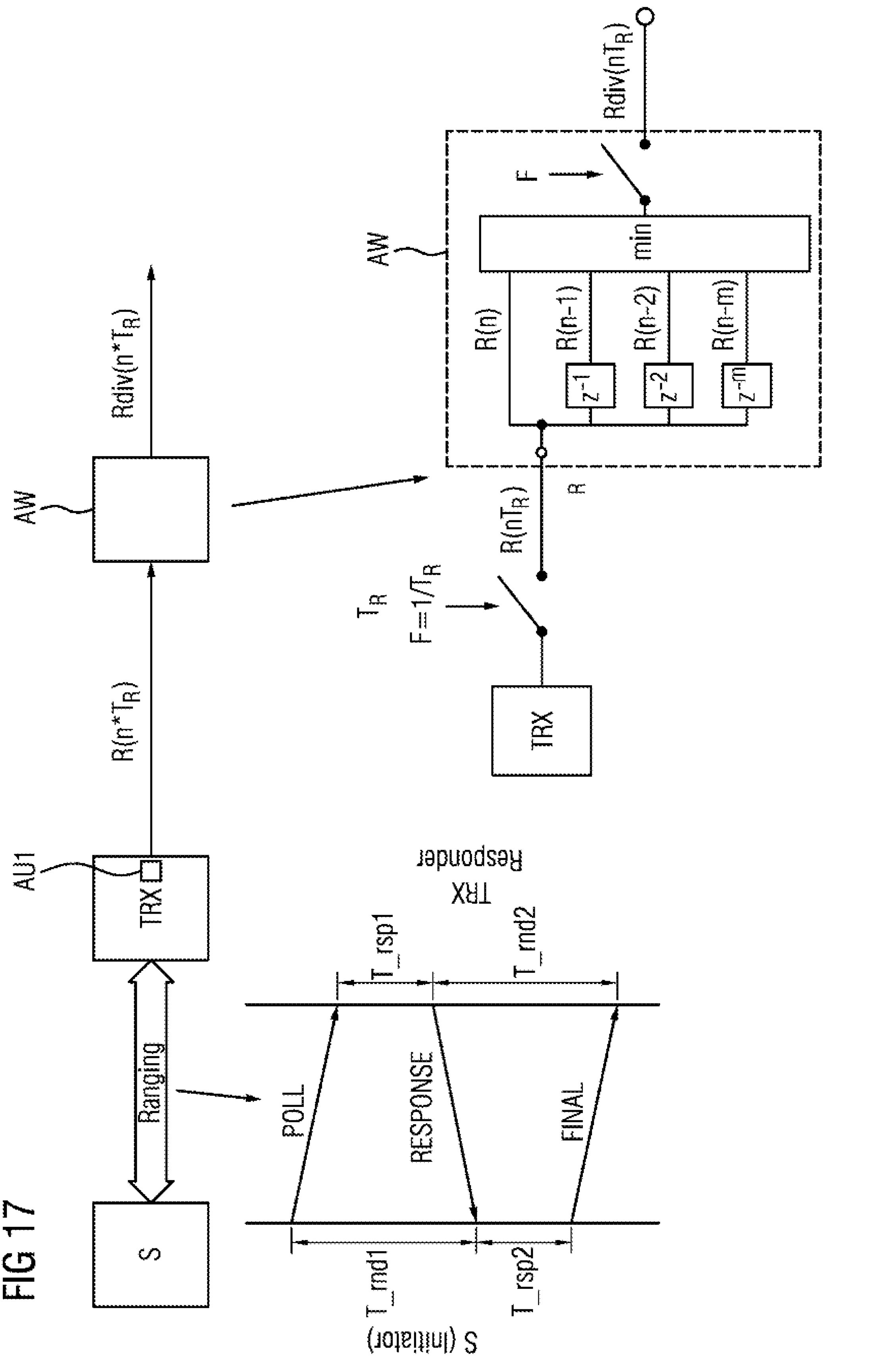

FIG. 17 schematically shows, for one embodiment of the invention, an example of a ranging sequence by transferring messages POLL, RESP, FINAL for a determination of distance values R using one or more evaluation units AU1 (for example in a transceiver TRX) and a selection of the present previous/last least distance value Rdiv of the stored last determined distance values R using a selection unit AW (shown in more detail on the bottom right).

In FIG. 17, in each case, for example, three or more messages POLL, RESP, FINAL are exchanged in both directions between a transceiver S (for example in a vehicle radio key for opening a vehicle via radio) and at least one motor vehicle-side transceiver TRX as so-called ranging sequences (carried out at time intervals TR) and distance values R (thus R (nTR)) are determined by means of transmission/reception times and/or time periods between transmission/reception of the messages at time intervals TR using an evaluation unit AU1, wherein the selection unit AW selects the present last least distance value Rdiv from multiple distance values R(n) (stored in memories z−1, z−2, z−m) (thus R(n−1), R(n−2), R(n−m)) and outputs at time intervals n*TR the respective least distance values Rdiv (n*TR) up to this point (for example to a controller which establishes an approach of the transceiver S to the motor vehicle if the selected distance values become smaller).

Figure 18:
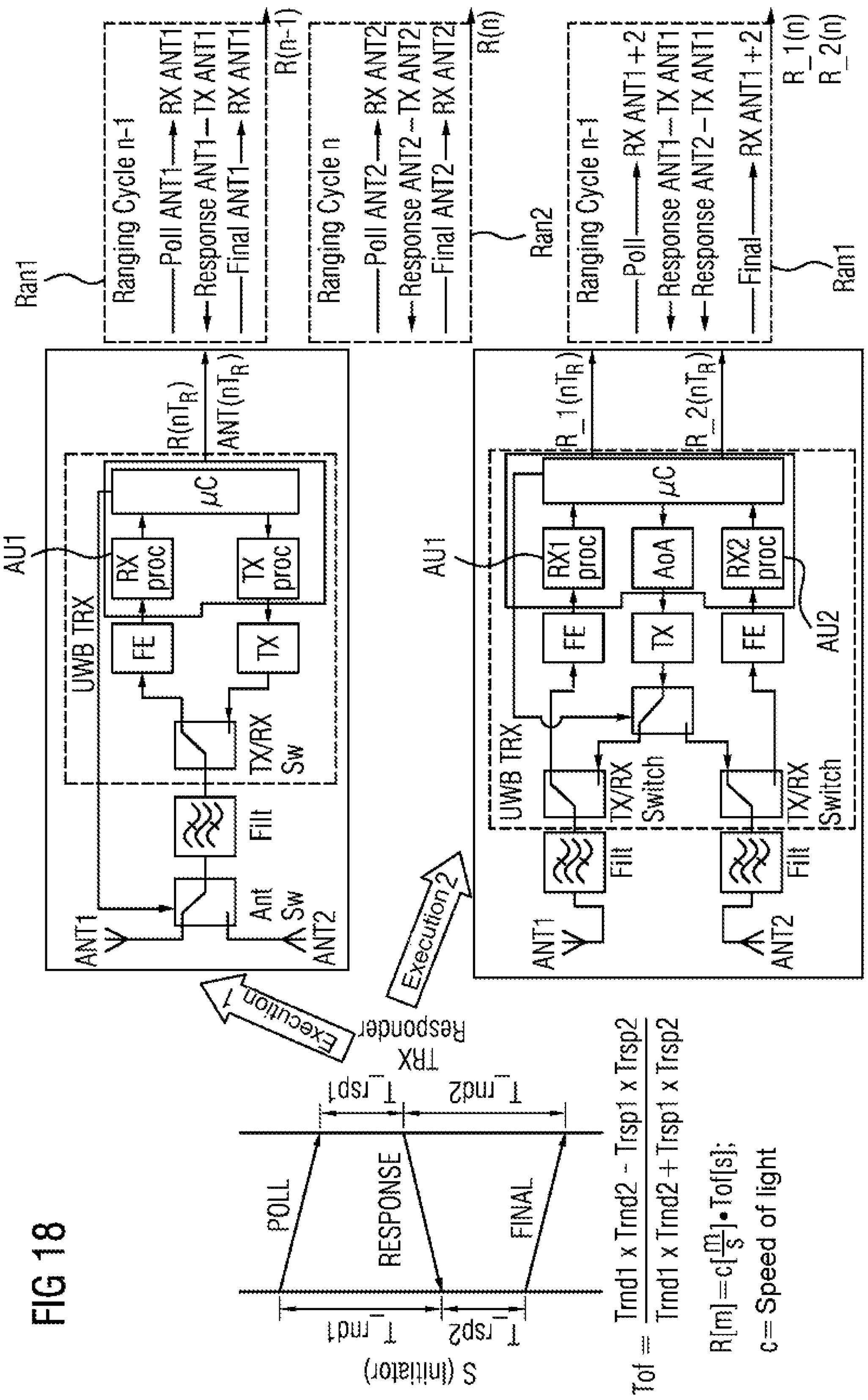
Figure 19:
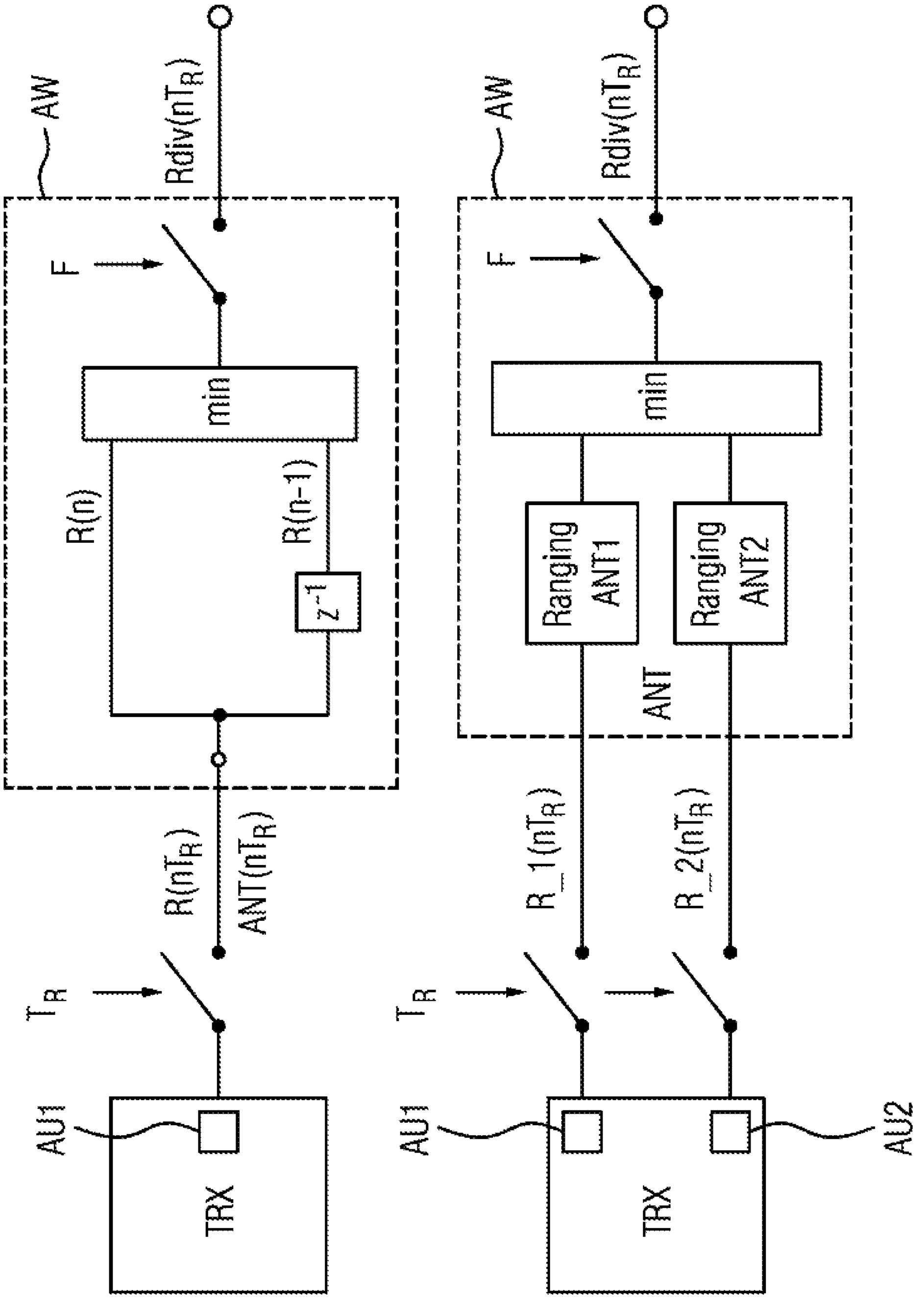

FIG. 18 schematically shows two embodiments of the invention, specifically in FIG. 18 at the top a respective sequential determination and output (at AW) in each case one of multiple distance values R(n*TR) using an evaluation unit AU1 after at least two sequential ranging actions (of which on the left in FIG. 18 only one is shown (with a formula for calculating one distance value in each case) and on the right in FIG. 18 both are shown)

and at the bottom in FIG. 18 shows a simultaneous/parallel determination and output (at AW) of two distance values R_1(n*TR), R_2(n*TR) in two evaluation units AU1, AU2 after two simultaneous interleaved (simultaneously ending) ranging sequences, FIG. 19 schematically shows for two embodiments of the invention as examples a selection of the present least Rdiv of the distance values R determined last (for example according to FIG. 17 or 18) using a selection unit AW, min (thus a minimum filter).

At the top in FIG. 19 (as at the top in FIG. 18), distance values R(n*TR) determined by a transceiver TRX at time intervals TR by ranging actions and only one evaluation unit AW1 are transmitted in succession to a selection unit AW, which upon arrival of a distance value R(n*TR) at least stores the one preceding it in time in at least one memory (z−1), and selects from the m at least two last (arrived and stored) distance values of m+1 distance values R(n), R(n−1), . . . R(n−m), the smallest one up to this point and outputs it as the present distance value Rdiv(nTR) (for example to a controller which observes the time curve).

At the bottom in FIG. 19, two determined distance values R(n*TR) at a time (as at the bottom in FIG. 18 by a transceiver TRX at time intervals TR by ranging actions and two evaluation units AU1, AU2) are each transmitted simultaneously to a selection unit AW, which, upon arrival of two distance values R(n*TR), selects the smallest one up to this point of the at least two (or more) last (arrived and possibly stored) distance values R(n*TR) and outputs it as the present distance value Rdiv(nTR).

According to embodiments of the invention, distance values R(n*TR) can be determined using messages Poll-A1-1, RESP-A1-1, FINAL-A1-1; Poll-A1-2, RESP-A1-2, FINAL-A1-2, etc. received by two or more antennas ANT1, ANT2 in or on the same transceiver TRX, S (which TRX, S can have in each case one or more receivers FE and one or more transmitters TX), specifically, for example, using one (FIG. 1: BBproc; μc) or two (FIGS. 2-4: RX1proc; RX2proc) evaluation units for determining a first distance value (R(1*TR)) and a second distance value (R(2*TR)), for example, alternating (alternately) in chronological succession using messages transmitted by the first antenna ANT1 (FIG. 15: Poll-A1-1, FINAL-A1-1) and received (FIG. 15: RESP-A1-1) and using messages transmitted by the second antenna ANT2

(FIG. 15: Poll-A1-2, FINAL-A1-2) and received (FIG. 15: RESP-A1-2).

FIGS. 1-4 show four exemplary embodiments according to the invention of transceivers S and/or TRX, having one or two antennas Ant1, Ant2, one or more receivers FE, transmitters TX, and possibly one or two evaluation units and furthermore show a selection unit AW, min connected to the transceivers TRX, TRX2, TRX3 (for example, via radio or via a bus BU), (here) in a controller Steu of a motor vehicle.

As in the illustrations in FIGS. 1-4, one transceiver S can be constructed and/or one transceiver TRX (or TRX2, TRX3) can be constructed in each case.

In FIG. 1, messages are transmitted using the first antenna ANT 1 (FIG. 15: Poll-A1-1, FINAL-A1-1) and received (FIG. 14: RESP-A1-1), and messages are transmitted using a second antenna ANT2 (FIG. 15: Poll-A1-2, FINAL-A1-2) and received (FIG. 14: RESP-A1-2).

In FIG. 1, alternately the first antenna ANT1 or the second antenna ANT2 is switched via an antenna switch ANTSw to receive and/or transmit messages.

Received and/or transmitted messages can be transferred via a filter Filt.

In FIG. 1, by ANTSw and a transmission/reception switch TX/RX/Sw, alternately the antenna ANT1 or the antenna ANT2 is connected via a receiver FE to an evaluation unit BBproc to evaluate received messages, or is connected to a transmitter TX to transmit messages (which can be connected to a controller μc (also denoted as mc)). A further controller μc can optionally be provided after the controller BBproc or also not.

If, for example, according to FIG. 14, the respective smaller last distance value or smaller last distance value determined to be valid (from last distance values determined n times using one of the antennas ANT1, ANT2 in each case at intervals TR) is selected, in FIG. 1, Rdiv(1*TR), Rdiv(3*TR), Rdiv(6*TR), Rdiv (8*TR), Rdiv(9*TR), Rdiv(9*TR), Rdiv(14*TR), Rdiv (16*TR) are output in succession as the present valid (selected) distance value, thus according to FIG. 14, for example, in succession the values 0.80 m, 0.90 m, 1.20 m, 1.40 m, 1.50 m, 1.50 m, 1.40 m, 1.50 m (for distances d1 of the key from the transceiver TRX on the part of the motor vehicle Kfz, thus the motor vehicle can be blocked, for example, because the user Usr moves away).

Figure 6:
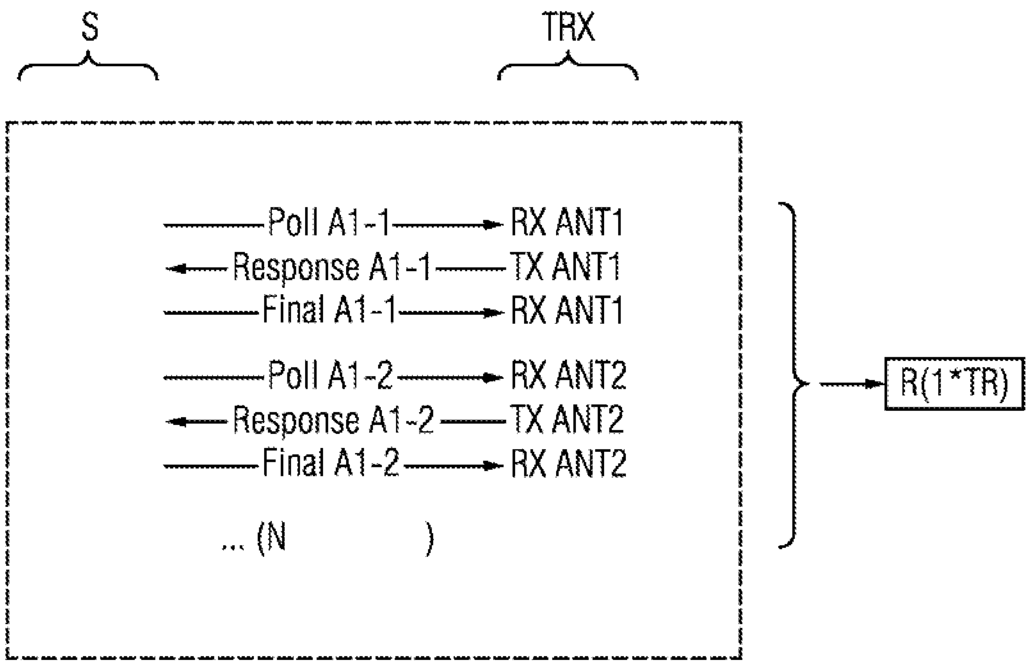
FIGS. 6-10 show various variants according to the invention of embodiments of the messages to be transferred (transmitted and/or received) and the evaluation thereof (for example in a ranging method)
Figure 7:
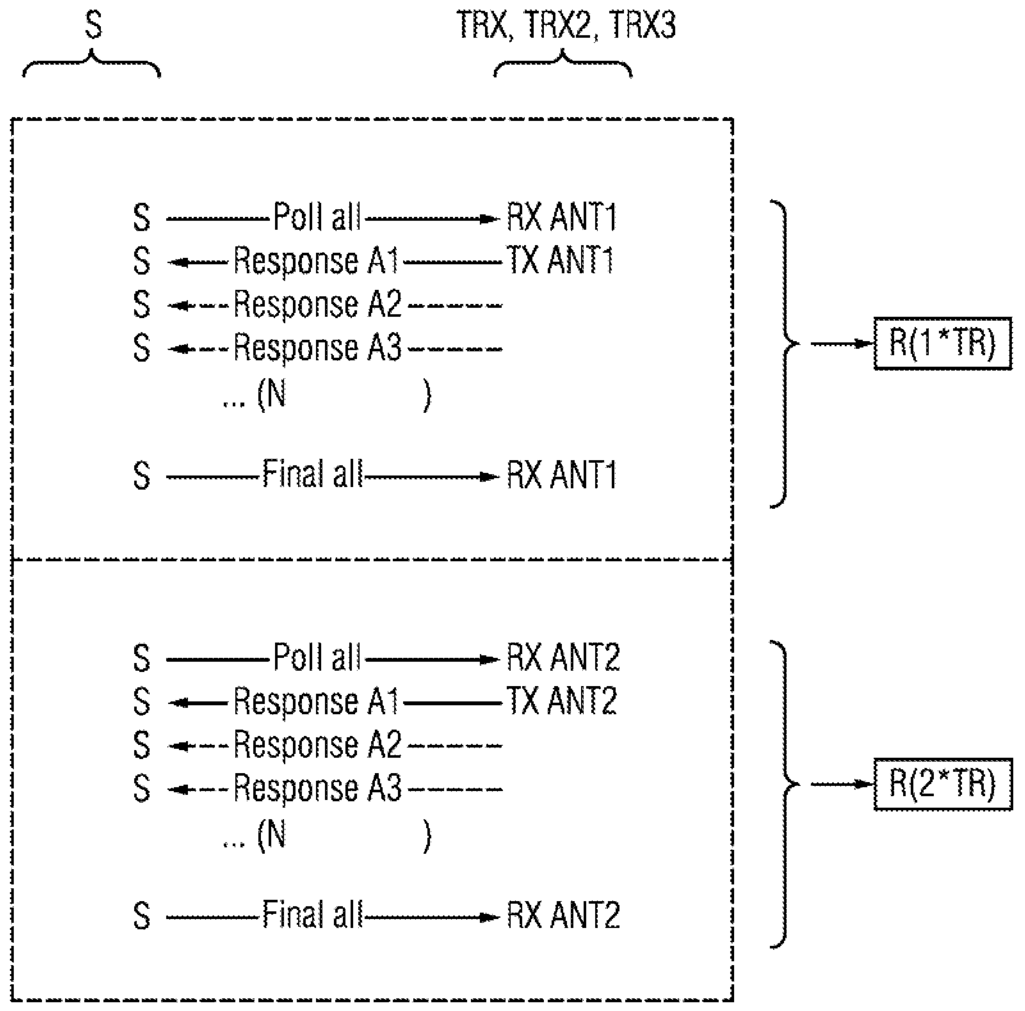
Figure 8:
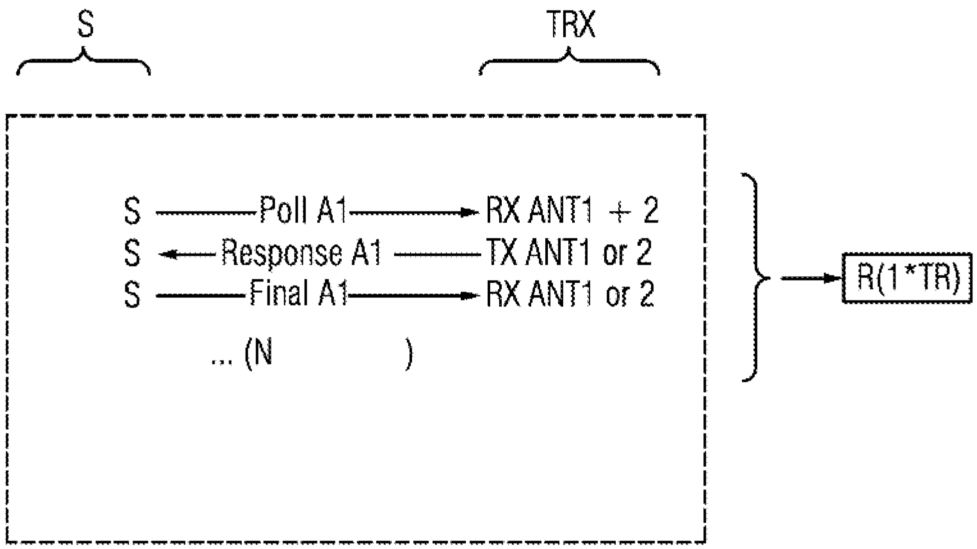
Figure 9:
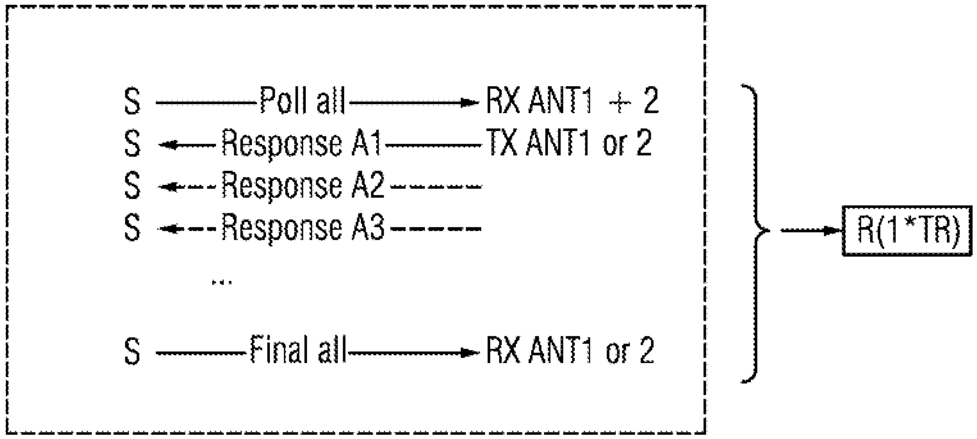

A selection unit AW, min in a controller Steu, for example, of the motor vehicle Kfz and/or in a motor vehicle-key-side transceiver S or in a motor vehicle-side transceiver TRX (or TRX2 . . . TRX 6) can select in each case from the (on the basis of the messages last transferred in each case by one of the two antennas ANT1, ANT2 (FIG. 5: Poll-A1-1, RESP-A1-1, FINAL-A1-1; Poll-A1-2, RESP-A1-2, FINAL-A1-2; FIG. 6; FIG. 7; FIG. 8; FIG. 9) determined distance values (R(TR), R((2*TR); R(3*TR); R(4*TR); . . . R(2*n*TR), R((2*n−1)*TR)), the smaller distance value (FIG. 14: in succession thus 0.80 m; 0.90 m; . . . 1.50 m), because this can be more accurate according to experience, for example.

Figure 2:
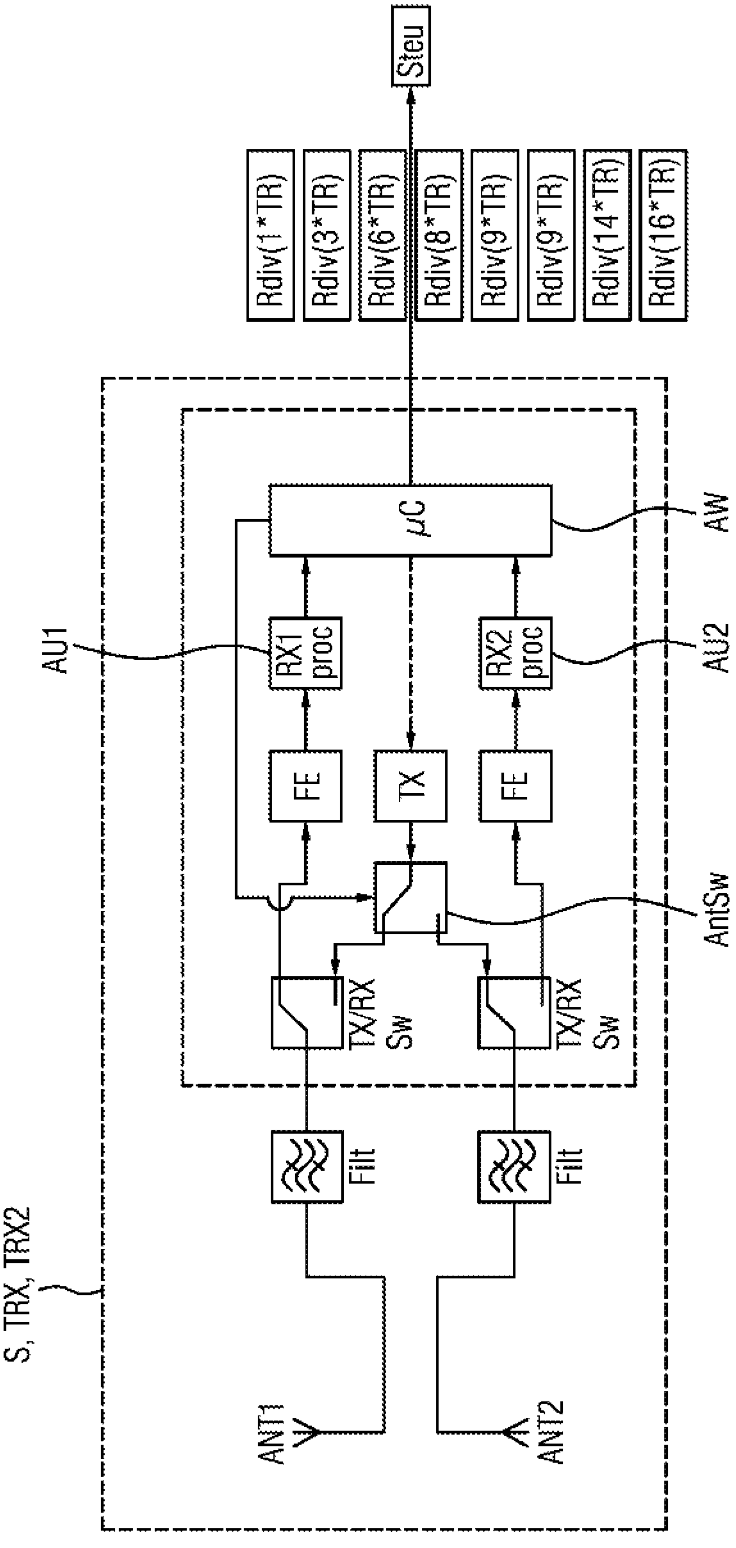
FIG. 2 shows an embodiment according to the invention having two receivers and having two evaluation units for the, for example, simultaneous and/or UWB-based determination of one distance value each and having two selection units for determining the lesser of the (switched diversity) for example, two determined distance values.

While in FIG. 1, an embodiment according to the invention having only one receiver and having only one evaluation unit for the UWB-based determination of one distance value in each case and having a selection unit for determining the lesser of the (switched diversity) distance values is shown, FIG. 2 shows an embodiment according to the invention having two filters Filt, two transmission/reception switches TX/RX/Sw, and an antenna switch AntSw connected downstream from the two transmission/reception switches TX/RX/Sw and having two evaluation units AU1, AU2, RX1proc, RX2proc, which each determine distance values using messages transmitted by the two antennas ANT1, ANT2, which are selected using a selection unit min, μc as:

Rdiv(1*TR), Rdiv(3*TR), Rdiv(6*TR), Rdiv(8*TR), Rdiv(9*TR), Rdiv(9*TR), Rdiv(14*TR), Rdiv (16*TR), thus according to FIG. 14, for example, in succession the values 0.80 m, 0.90 m, 1.20 m, 1.40 m, 1.50 m, 1.50 m, 1.40 m, 1.50 m.

If necessary (shown by dashed lines) the messages to be transmitted via at least one of the antennas ANT1, ANT2 can also be formed by a selection unit min, μc and/or the transmission time thereof can be determined.

Figure 3:
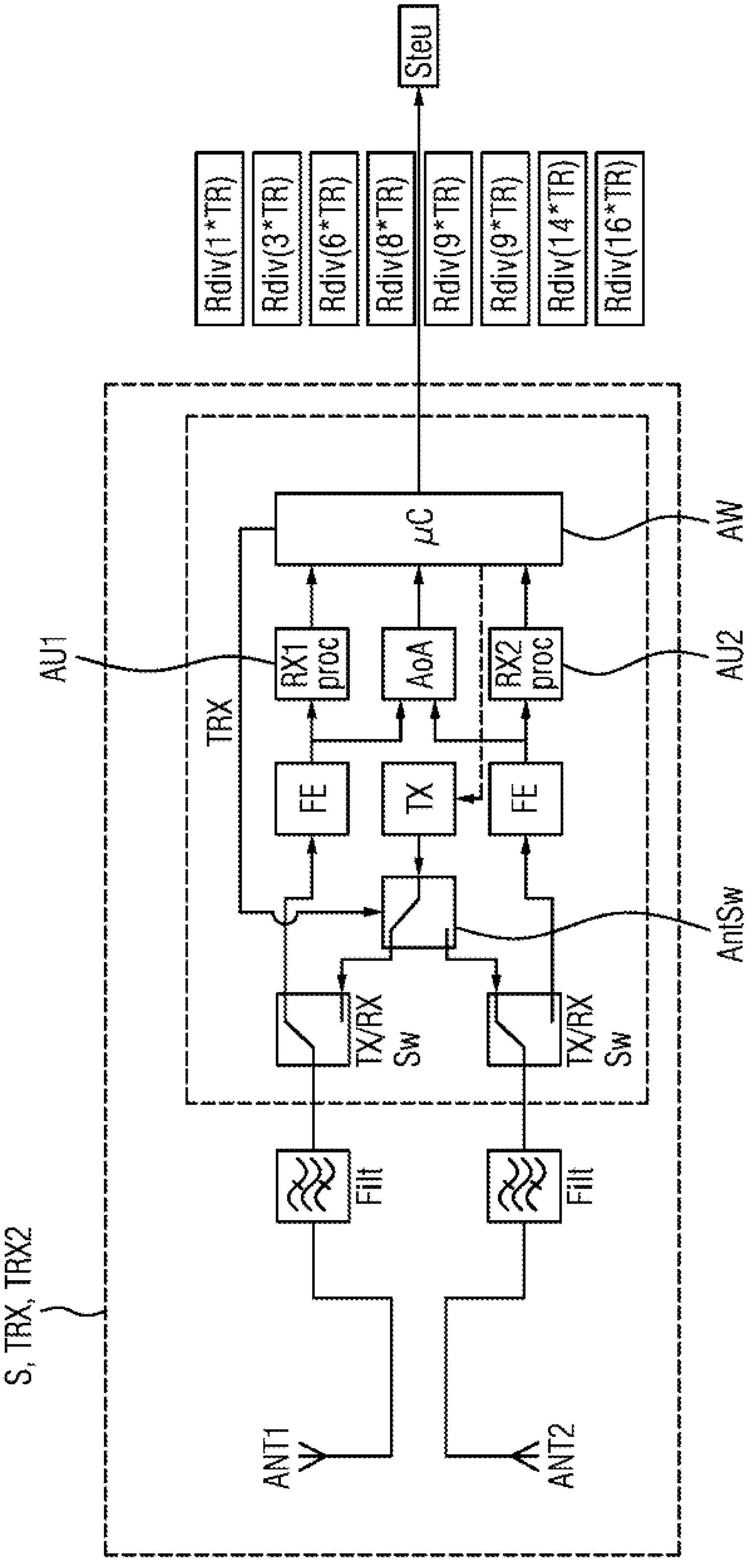
FIG. 3 shows an embodiment according to the invention for determining an angle (angle of arrival)
Figure 4:
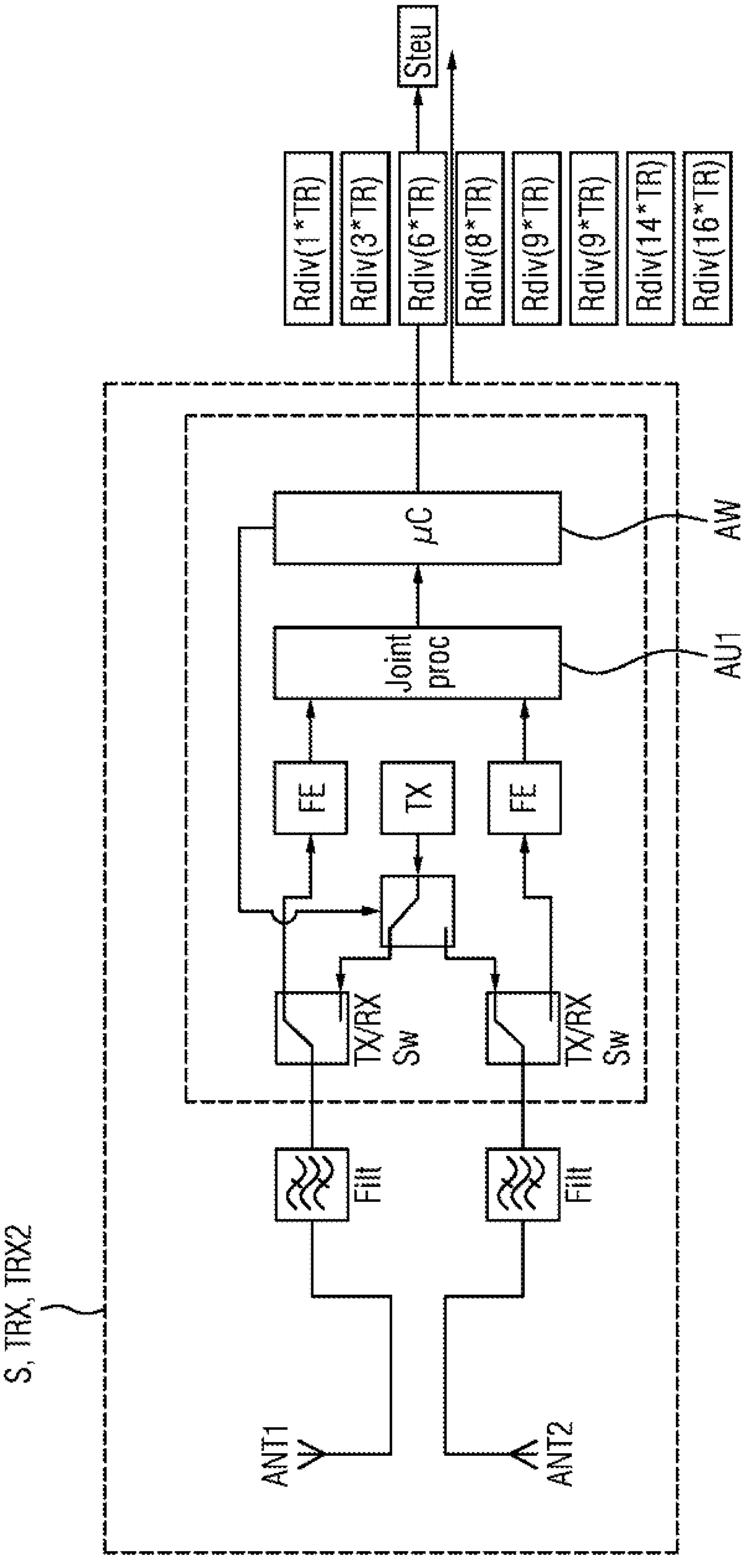
FIG. 4 shows an embodiment according to the invention having a common evaluation unit for the messages transmitted by the two antennas of a transceiver.
Figure 5:
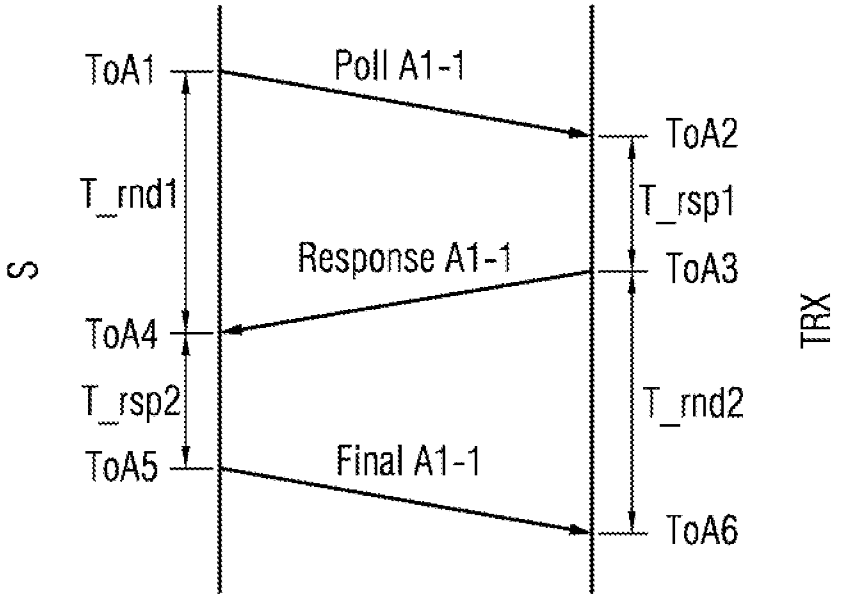
FIG. 5 shows how a value for a time of flight is determined, for example, by "ranging" using, in this case, at least three messages transferred between a first, for example, transceiver at the motor vehicle key and at least one further transceiver, for example, at the motor vehicle.

For example, signals from both antennas ANT1, ANT2 can be evaluated simultaneously or combined by two parallel receivers FE and evaluation units R1proc, R2rpoc in FIGS. 2-4 and/or for received messages coming from each of the two antennas ANT1, ANT2 (possibly approximately simultaneously or overlapping) (for example, FIG. 5: Poll-A1-1; Final-A1-1; Poll-A1-1, Final-A1-2) and/or for messages to be transmitted using each of the two antennas ANT1, ANT2 (for example, FIG. 5: Response-A1-1, Response-A1-2), the times ToA (thus ToA1, ToA2, ToA3, ToA4, ToA5, ToA6) of their arrival at an antenna ANT1, ANT2 can be determined separately and possibly time intervals and/or a time of flight ToF and/or distance values d1, d2 can be calculated therefrom.

In FIG. 3, an angle (angle of arrival) is also determined using a unit AoA.

In FIG. 4, as in FIG. 1, a common evaluation unit Jointproc AW1 is provided for messages transferred by the two antennas ANT1, ANT2.

A determined distance value (Rdiv(TR), Rdiv((2*TR); Rdiv(3*TR); Rdiv(4*TR); . . . Rdiv(2*n*TR), Rdiv((2*n−1)*TR)) and also a distance value selected from determined distance values (Rdiv(1*TR), Rdiv(3*TR), Rdiv(6*TR), Rdiv(8*TR), Rdiv(9*TR), Rdiv(9*TR), Rdiv(14*TR), Rdiv (16*TR))

can be a time of flight ToF between two transceivers S, TRX or a distance d1 between two transceivers S, TRX or can represent it (for example, because a distance is determinable from times of flight or times).

If a distance value (R(TR), R((2*TR); R(3*TR); R(4*TR); . . . R(2*n*TR), R((2*n−1)*TR)) is a time of flight (Tof in FIG. 5), the distance d1 (at the time n*TR), for example, of the key-side transceiver S from the motor vehicle-side transceiver TRX can be calculated, for example, as the product of the velocity v of the message propagation in air and from the time of flight: d1=Rdiv(TR)*v.

FIG. 5 shows an embodiment according to the invention in which, by way of three messages Poll-A1-1, RESP-A1-1, FINAL-A1-1 transferred between a first (for example, motor vehicle-key-side and/or user-side) transceiver S initializing the message exchange (with PollA1-1) and at least one further (for example, motor vehicle-side) transceiver TRX (for example, UWB-based), a value for a time of flight between two transceivers S, TRX is determined, in that in succession the messages Poll-A1-1, RESP-A1-1, FINAL-A1-1 are transferred and the four times T_rnd1, T_rsp1, T_rsp2, Trnd2 are determined, which can reduce, for example, influences of timer inaccuracies:

$$\mathrm{ToF}=(T\_\mathrm{rnd1}*\mathrm{Trnd2}-T\_\mathrm{rsp1}*T\_\mathrm{rsp2})/(T\_\mathrm{rnd1}+T\mathrm{rnd2}+T\_\mathrm{rsp1}+T\_\mathrm{rsp2})$$

In this case, for example, the message FINAL-A1-1 can indicate the time intervals T_rnd1 and T_rsp2 measured on the part of the transceiver S and/or the times ToA1, ToA4, ToA5, of the reception or transmission there of messages (Poll-A1-1, RESP-A1-1, FINAL-A1-1), so that on the part of the transceiver TRX, using the four times (T_rnd1, T_rsp1, T_rsp2, Trnd2) that are known there or can be calculated from arrival/transmission times (ToA1, ToA2, ToA3, ToA4, ToA5, ToA6), a value can be calculated for a time of flight ToF between at least two transceivers S, TRX (and therefrom a distance d1).

Such a transfer of three messages Poll-A1-1, RESP-A1-1, FINAL-A1-1 between two or more than two transceivers S, TRX and determination based thereon of a time of flight value ToF representing at least one distance d1 is also referred to as a "ranging sequence".

A first such "ranging sequence" can also be a transfer of three messages Poll-A1-1, RESP-A1-1, FINAL-A1-1 between two or more than two transceivers S, TRX and determination based thereon of a time of flight value representing at least one distance d1, and, for example, a further "ranging sequence" can be a transfer of three further messages Poll-A1-2, RESP-A1-2, FINAL-A1-2 between two or more than two transceivers S, TRX2 (and/or via a further one of the antennas of the same transceiver TRX) and determination based thereon of at least one distance d1 (or d2) of the value representing, for example, the same time.

FIGS. 6-10 show different variants according to the invention of embodiments of the messages to be transferred (transmitted and/or received) and the evaluation thereof (for example in a ranging method) using, for example, N transceivers on the part of a vehicle.

In FIG. 6, first three messages are transferred on the part of the one transceiver TRX via a first antenna ANT1 (for example the same one for all three) of the transceiver TRX, namely first the message Poll-A1-1 is received, then the message RESP-A1-1 is transmitted, then the message Final-A1-1 is received. From times and/or time intervals measured for this purpose (on the part of S and/or TRX), as described above, a value for a (filtered and/or for example averaged and/or ascertained ranging) time of flight ToF between the two transceivers S, TRX and/or for a distance d1 between the two transceivers S, TRX can be determined, for example, the first determined distance value R(1*TR)=0.80 m (in FIG. 14) for the distance d1.

In FIG. 6, three messages are then transferred via a second antenna ANT2 (for example the same one for these three messages) of the transceiver TRX on the part of the one transceiver TRX, namely first the message Poll-A1-2 is received, then the message RESP-A1-2 is transmitted, then the message Fianl-A1-2 is received. From times and/or time intervals measured for this purpose (on the part of S and/or TRX), as described above, a value of a time of flight can be determined between the two transceivers S, TRX and/or for a distance d1 between the two transceivers S, TRX, for example, the (in FIG. 15) second distance value R(2*TR)=2.30 m for the distance d1 determined (using measured times and/or points).

(This transfer of 2 times three, thus six, messages in FIG. 6 can be referred to as a ranging sequence or a "ranging cycle" or as two ranging sequences or two "ranging cycles").

From these two distance values R(1*TR)=0.80 m and R(2*TR)=2.30 m determined (approximately) simultaneously or in succession, the smaller one determined as valid (sometimes one cannot be determined) can be selected by a selection unit AW; min; µc as the distance d1 to be assumed, thus, for example (selected from 0.80 m and 2.30 m), 0.80 cm.

Then accordingly three (or two times three) messages can possibly also be transferred in each case between the key S and further (N) transceivers (also referred to in short as "anchors") TRX2, TRX3, TRX4, TRX5, TRX6 (each of the motor vehicle Kfz) and evaluated and the smallest valid distance value to the transceiver S can in each case accordingly be selected with respect to these further transceivers (each having 2 antennas).

The transfer of messages, determination of the distance values R(1*TR), R(2*TR) before the selection of the smaller measured/determined thereof (as Rdiv) can take place in succession or in an example as in FIGS. 2-4 (having two antennas, receivers, and evaluation units) also in parallel.

A decision about a selection of one of two antennas ANT1, ANT2 for the transmission and/or reception of messages can be made independently in each transceiver TRX, S, for example, or can be proposed to it by a controller Steu, for example, via a bus or via radio, etc.

In FIG. 7 (using a ranging sequence also referred to as "interleaved ranging"), first, on the part of the one transceiver TRX, multiple messages are transferred via one (for example, the same one for all three) first antenna ANT1 of the transceiver TRX and one antenna each of each of the further transceivers TRX2, TRX3 etc. (of the motor vehicle).

First the (initializing and/or requesting) message Poll-all is thus transmitted from the transceiver S and received by the transceivers TRX, TRX2, TRX3, whereupon each of the transceivers TRX, TRX2, TRX3, etc. then each transmits a message RESP-A1 or Response-A2 or Response A3, respectively (which S receives), whereupon the transceiver S then transmits a message Final-all (to all transceivers TRX, TRx, TRX3, etc.) and the transceivers TRX, TRX2, TRX3, etc. receive the message Final-all (and pass it on to their one or more receivers/evaluation units).

Since in this case one transceiver S, for example, transfers messages on the part of a (motor vehicle) key (of a user Usr) or key fob with multiple transceivers TRX, TRX2, TRX3 (on the part of a motor vehicle Kfz), the transceiver S can determine, for example, on the part of a (motor vehicle) key (of a user Usr) and/or all or multiple of the transceivers TRX, TRX2, TRX3, etc. (on the part of a motor vehicle Kfz) one distance value in each case relating to a distance d1, d2, d3, etc. of the transceiver S to one of the transceivers TRX, TRX2, TRX3 (on the part of a motor vehicle Kfz), thus possibly multiple distances, which can enable additional security from manipulation (in particular if a controller Steu of the motor vehicle Kfz, for example, connected via a bus or via radio, checks this in a consolidated manner for multiple transceivers TRX, TRX2, TRX3).

In FIG. 7 at the bottom, a ranging sequence is carried out using the respective second antenna ANT2 of each of the transceivers TRX, TRX2, TRX3.

FIG. 7 shows a "ranging cycle" (query sequence) in each case at the top and bottom, which can result, for example, in each case in one distance value R(1*TR), R(2*TR) (possibly consolidated for all transceivers), or can result in one distance value per transceiver.

In FIG. 8, three messages are transferred on the part of a transceiver TRX via the one (for example the same one for all three) first antenna ANT1 of the transceiver TRX or via the other of the antennas ANT1, ANT2 (for the three messages).

In FIG. 8, first the message Poll-A1 (transmitted by the receiver S) is received by the transceiver TRX, then the message Response-A1 is transmitted by the transceiver TRX, then the message Final-A1 (transmitted by the transceiver S) is received by the transceiver TRX.

The transceiver TRX (or possibly then accordingly each other transceiver TRX2, TRX3, etc. on the part of the motor vehicle Kfz) can decide for each of the messages RESP-A1 Final-A1 to be transferred, via which antenna ANT1 or ANT2 it (Response-A1) is to be (Ant-Sw) transmitted, or possibly also via which antenna ANT1 or ANT2 it (Poll-A1, Final-A1) is to be received, for example, by selection using a switch (thus via which amplifier RX after the selected antenna and/or which evaluation unit and/or selection unit it is to be evaluated).

In FIG. 8 it is thus, for example, decided and executed that the message Poll-A1 and RESP-A1 Final-A1 is received via both antennas ANT1 and ANT2, and that the message Response-A1 is transmitted via the antenna ANT1 and that an evaluation of the message Final-all takes place received via the antenna ANT2.

In FIG. 9, as in FIG. 8, three messages are transferred via the first antenna ANT1 of the transceiver TRX and/or via the other of the antennas ANT1, ANT2 on the part of a transceiver TRX.

However, messages are exchanged between a first transceiver S and multiple transceivers TRX, TRX2, TRX3 on the part of the motor vehicle Kfz (for example, chronologically interleaved/in parallel/partially overlapping/interleaved, etc.).

In FIG. 9, first the message Poll-all (transmitted by the receiver S) is received (by transceivers TRX, TRX2, TRX3), then the message Response-A1 is transmitted by the transceiver TRX and the message Response-A2 is transmitted by the transceiver TRX2 and the message Response-A3 is transmitted by the transceiver TRX-3, then the message Final-A1 is transmitted (by the transceiver S) and received by the transceivers TRX, TRX-2, TRX-3 (and used in each of the transceivers TRX, TRX-2, TRX-3 to determine at least one distance value representing a distance d1, d2, d3).

In each transceiver TRX, TRX2, TRX3 (on the motor vehicle side), a transfer of a message can alternatively be carried out using the one or the other of its antennas ANT2, ANT2.

Figure 10:
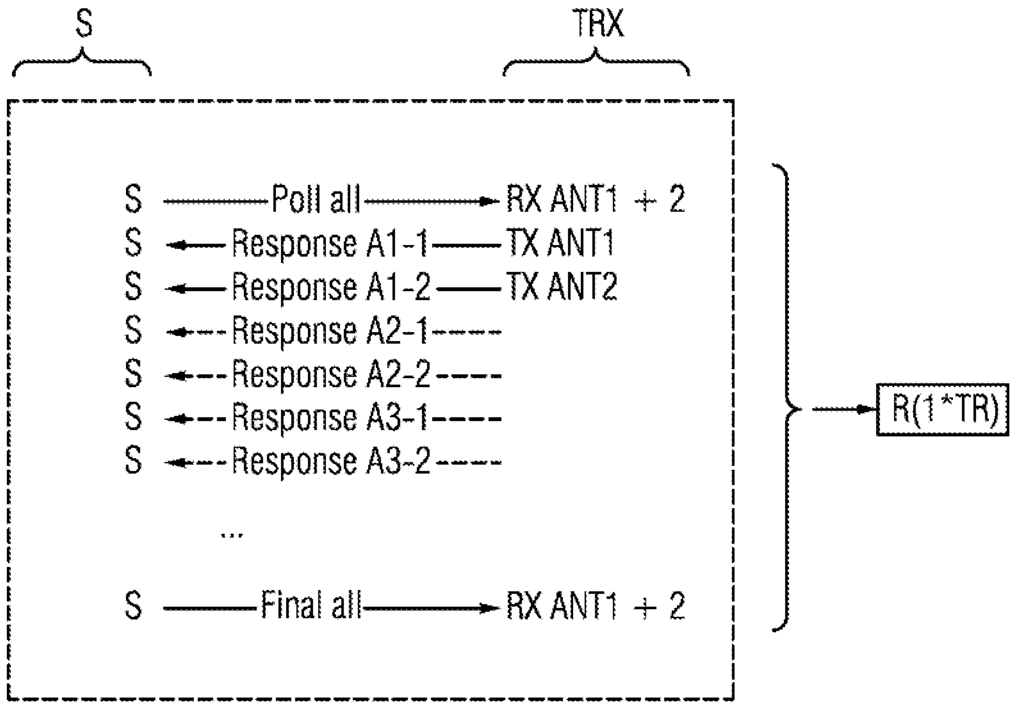

In FIG. 10 (in contrast to FIG. 9), the transceiver TRX (after receiving a message Poll-all previously transmitted by the transceiver S) transmits twice in succession a message using one of the two antennas ANT1, ANT2 in each case as a response.

The transceiver TRX thus transmits (after receiving a message Poll-all previously transmitted by the transceiver S) via, for example, its antenna ANT1, a message Response-A1-1 and then via its antenna ANT2, a message Response-A1-2, which messages Response-A1-1 and Response-A1-2, the transceiver S can select or can respond to both separately.

Furthermore, the transceiver TRX2 (after receiving a message Poll-all previously transmitted by the receiver S) transmits, for example, via its antenna ANT1, a message Response-A2-1 and then via its antenna ANT2, a message Response-A2-2, which messages Response-A2-1 and Response-A2-2 the transceiver S can select or can respond to both separately. Furthermore, the transceiver TRX3 (after receiving a message Poll-all previously transmitted by the receiver S) transmits, for example, via its antenna ANT1, a message Response-A3-1 and then via its antenna ANT2, a message Response-A3-2, which messages Response-A3-1 and Response-A3-2 the transceiver S can select or can respond to both separately. The last message Final-all (in the interleaved ranging cycle number x shown) of the transceiver S (in the motor vehicle key) is received by multiple or all motor vehicle-side transceivers TRX, TRX2, TRX3, etc., and the message Final-all can contain several arrival times/transmission times and/or time periods of messages selected by transceiver S or all messages known (transmitted/received) to the transceiver S. Therefore, each of the motor vehicle-side transceivers TRX, TRX2, TRX3 can determine one or two distance values E (each representing one distance) and can possibly select from two the smaller valid one (successfully by measurements of times/points in time and calculation of a distance).

Figure 11:
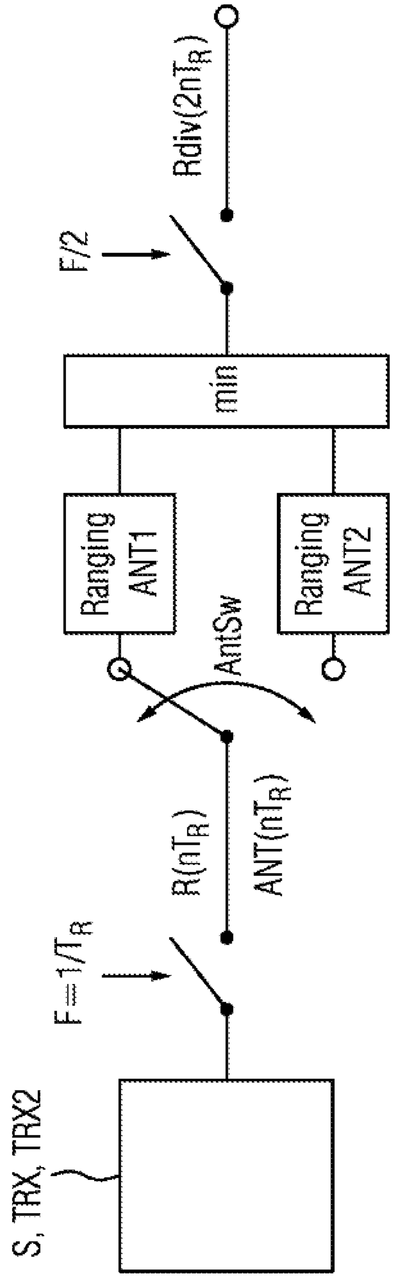
FIG. 11 shows an embodiment according to the invention of an evaluation circuit having an alternating switching of time (point) values or distance values R coming from two antennas to two evaluation units.

In the exemplary embodiment of the invention according to FIG. 11, in multiple (n) time intervals (n*TR; n=natural number=1, 2, 3, 4, 5 . . . ), in each case a determination of a distance value (R(1*2*TR), R(2*2*TR), . . . R(2*n*TR)) representing a time of flight (ToF) and/or a distance (d1) between at least two transceivers (S, TRX) takes place repeatedly by exchanging messages (FIG. 5: Poll-A1-1, RESP-A1-1, FINAL-A1-1; Poll-A1-2, RESP-A1-2, FINAL-A1-2; FIG. 6; FIG. 7; FIG. 8; FIG. 9) between the at least two transceivers (S, TRX), in that (after, for example, one time interval TR in each case, thus at a frequency 1/TR=fR) using an antenna switch AntSw, the sequence of messages received/transmitted and evaluated using two antennas ANT 1 of a transceiver TRX are alternately switched to one of two illustrated evaluation units Ranging-ANT1 and Ranging-ANT2 which each determine distance values (R(1*2*TR), R(2*2*TR), R(2*n*TR)) from messages, from which the selection unit min selects (as Rdiv( . . . )) in each case the smaller valid one (or if both are presently not valid the preceding smaller valid one).

In FIG. 11, the frequency F/2 at which selected (min) distance values (thus in each case the smaller of the two last ones) are output is half of the frequency F=1/TR at which distance values are determined (before the selection of the smaller of the last two).

FIG. 12 uses for a case of only one evaluation unit (but two messages alternately evaluated thereby from antennas ANT1, ANT2), a delay element z−1 connected downstream having a memory to store the respective current (determined) distance value Rdiv(n) and to compare it after successive arrival of the next present (determined) distance value R(n) as the then preceding distance value R(n−1) to this next present one in a selection unit min, which, of two distance values R(n), R(n−1), selects the smaller (valid) one.

Further handling can be carried out using a Kalman filter Kalm.

Results can possibly also be used for machine-based learning (Mach) as shown on the bottom right in FIG. 12.

Figure 13:
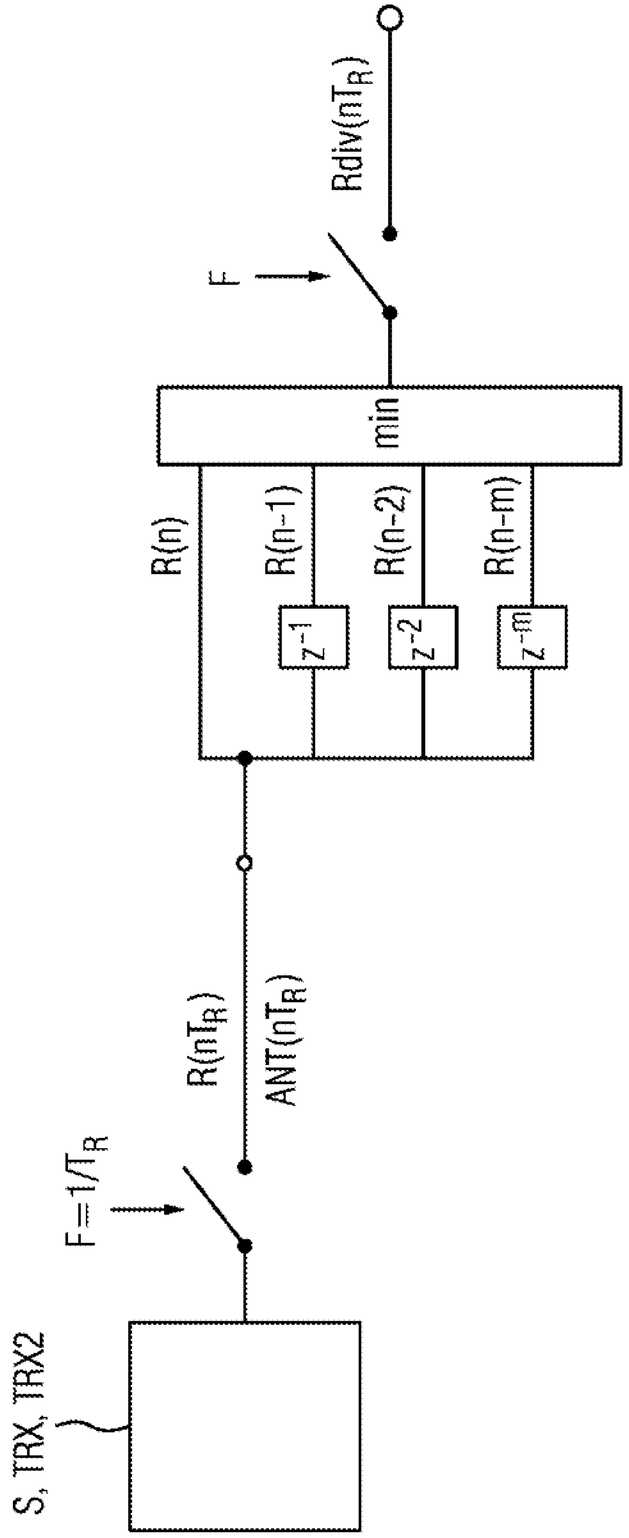
FIG. 13 shows an embodiment according to the invention having multiple temporary memories for storing at least one of the last distance values for the case that, of the present distance values, one or both could not be determined (as valid)

In contrast to FIG. 12, FIG. 13 uses multiple (m) delay elements z−1, z−2 . . . z−m having a memory to store multiple previously determined distance values R(n−1)m R(n−1), . . . R(n−m).

Thus, for example, to store the respective present distance value R(n) and, after arrival of the next present distance value R(n), to compare the distance value R(n−1) preceding it thereto in a selection unit min, which, of two distance values R(n), R(n−1), selects the smaller (valid) one or if neither is valid possibly also the smaller valid R(n−2) or R(n−m) preceding it (as Rdiv( . . . ).

FIG. 13 shows the general form of the min filter. In the filter, in contrast to the embodiment in FIG. 11, the sampling frequency (=update rate) is maintained at the input.

For example, according to FIG. 14, if the smaller last valid determined (measured) distance value which is applied to the input of the min block is selected, in FIG. 14 in succession Rdiv(1*TR), Rdiv(1*TR), Rdiv(3*TR), Rdiv (3*TR), Rdiv(5*TR), Rdiv(6*TR), Rdiv(6*TR), Rdiv (7*TR), Tdiv(8*TR) etc. are output as the present valid distance value, thus according to FIG. 14 in succession the values 0.80 m, 0.80 m, 0.90 m, 0.90 m, 1.30 m, 1.20 m, 1.20 m, 1.40 m, 1.50 m, etc. The example in FIG. 14 results, for example, in an arrangement as in FIG. 11.

The invention claimed:

1. A vehicular key system, comprising:

a first transceiver having at least one antenna for transferring messages;

a second transceiver having a first antenna and a second antenna for transferring messages with the first transceiver;

at least one evaluation unit configured to determine a first distance value using messages transferred by the at least one antenna and to determine at least one second distance value using messages transferred by the at least one antenna, a selection unit configured to select the smallest distance value from the last determined distance values of the first and second distance values;

wherein the selection unit is configured to select the smaller of the last two determined distance values of the first and second distance values in response to a distance value being determined from messages received by both the first antenna and the second antenna; and wherein the selection unit is configured to determine the last distance value from messages received by the first antenna in response to a distance value being undeterminable from the last transmitted messages received by the second antenna.

2. The system as claimed in claim 1, wherein the first and second transceivers are spatially separated from one another on a motor vehicle.

3. The device as claimed in claim 1, wherein multiple distance values are each determined by one of multiple ranging sequences carried out in succession, the ranging sequences each comprising a transfer of messages by in each case transmitting and receiving the messages via only one antenna of a transceiver, and wherein these multiple distance values are taken into consideration by the selection unit in the selection of the smallest of the distance values previously determined as valid.

4. The device as claimed in claim 1, wherein multiple distance values are each determined by one of multiple ranging sequences carried out in succession, which each comprise a transfer of messages by in each case at least one of transmitting and receiving the messages via one of multiple antennas of a transceiver, wherein within each ranging sequence fewer than all messages are transferred via the same of the multiple antennas of one transceiver, wherein these multiple distance values are taken into consideration by the at least one selection unit in the selection of the smallest of the distance values previously determined as valid.

5. The device as claimed in claim 1, wherein multiple distance values are each determined by one of multiple chronologically overlapping ranging sequences which each comprise a transfer of messages by in each case at least one of transmitting and receiving the messages via one of multiple antennas of the second transceiver, wherein these multiple distance values are taken into consideration by the at least one selection unit in the selection of the smallest of the distance values previously determined to be valid.

6. The device as claimed in claim 1, wherein by at least one transceiver, at least two of the distance values are determined simultaneously, wherein these multiple distance values are taken into consideration by the at least one selection unit in the selection of the smallest of the distance values previously determined to be valid.

7. The device as claimed in claim 1, further comprising an antenna switch connected to the first and second antennas of the second transceiver switches between the antennas to in each case transmit or receive one of the messages deliberately using only one of the antennas.

8. The device as claimed in claim 1, further comprising an antenna switch of the second transceiver is activated such that when using both antennas, one or more messages are received, but at least one or more messages are each transmitted using only one of the antennas.

9. The device as claimed in claim 1, wherein the selection unit is configured to output at respective equal time intervals in each case a previous smallest distance value determined by it, which it selects from distance values present in a memory if it carries out ranging sequences in succession using two antennas of one transceiver or if it simultaneously carries out ranging sequences using two antennas of one transceiver or if it carries out one ranging sequence using only one antenna of one transceiver.

10. The device as claimed in claim 1, wherein distance values are only determined to be valid if a distance value in a form of a distance or a time interval could be determined for them.

11. The device as claimed in claim 1, wherein the last determined distance values, from which the selection unit is provided to select a respective present smallest distance value, are at least one of only a predefined number of distance values and only distance values within a predefined time period of several seconds or minutes, in which an approach of a transceiver of a vehicle key to a motor vehicle is tracked.

12. The device as claimed in claim 1, wherein on the part of a controller connected to at least one of the transceivers, the selection unit and the at least one evaluation unit are provided as a controller having a program stored in a memory and executed by a processor for this purpose.

13. The device as claimed in claim 1, wherein the selection unit is configured to select in each case from the last, determined based on messages transferred by one of two antennas of at least one transceiver, two distance values, the smaller of two last determined distance values, if, on the basis of the messages last transmitted for both of the antennas, one distance value could be determined in each case but to select the last distance value determined for one of the antennas, if, on the basis of the last transferred messages for precisely one of the antennas, a distance value could not be determined.

14. The device as claimed in claim 1, wherein the at least one evaluation unit is a single evaluation unit configured to determine both the first distance value and the second distance value, and further comprising a switching unit connected in a switchable manner to the first antenna and the second antenna.

15. The device as claimed in claim 1, wherein the at least one evaluation unit comprises:

a first evaluation unit configured to determine the first distance value using messages transferred by the first antenna, and a second evaluation unit configured to determine the second distance value using messages transferred by the second antenna.

16. The device as claimed in claim 1, wherein the selection unit is connected to a controller of a motor vehicle, the controller being connected to at least one of at least one door opener and an engine controller of the motor vehicle, and configured to activate thereof as a function of at least one of at least one determined time of flight and a distance between at least two transceivers respectively on the part of a motor vehicle and on the part of a vehicle key.

17. The device as claimed in claim 1, wherein a plurality of transceivers of the device each have a selection unit configured to select in each case from respective last, determined based on messages transferred by one of the two antennas connected to it, distance values, the smaller distance value.

18. The device as claimed in claim 1, wherein at least one of the transceivers exchanges messages with at least two further transceivers and determine at least one of multiple distance values and distances to one of the further transceivers in each case.

19. The device as claimed in claim 18, wherein a decision about the antenna to be used for next transmission of a message is made based on last reception of a message, and the antenna for which comparison to the further antenna provides at least one of chronologically earlier and first path result of the last reception of a message is selected for the next transmission of a message.

* * * * *